No. 689,593. Patented Dec. 24, 1901.
M. LARY.
FLOUR SIFTER.
(Application filed Apr. 24, 1901.)

(No Model.) 2 Sheets—Sheet 1.

WITNESSES:

INVENTOR
Morris Lary.
BY
Smith & Davison
ATTORNEYS.

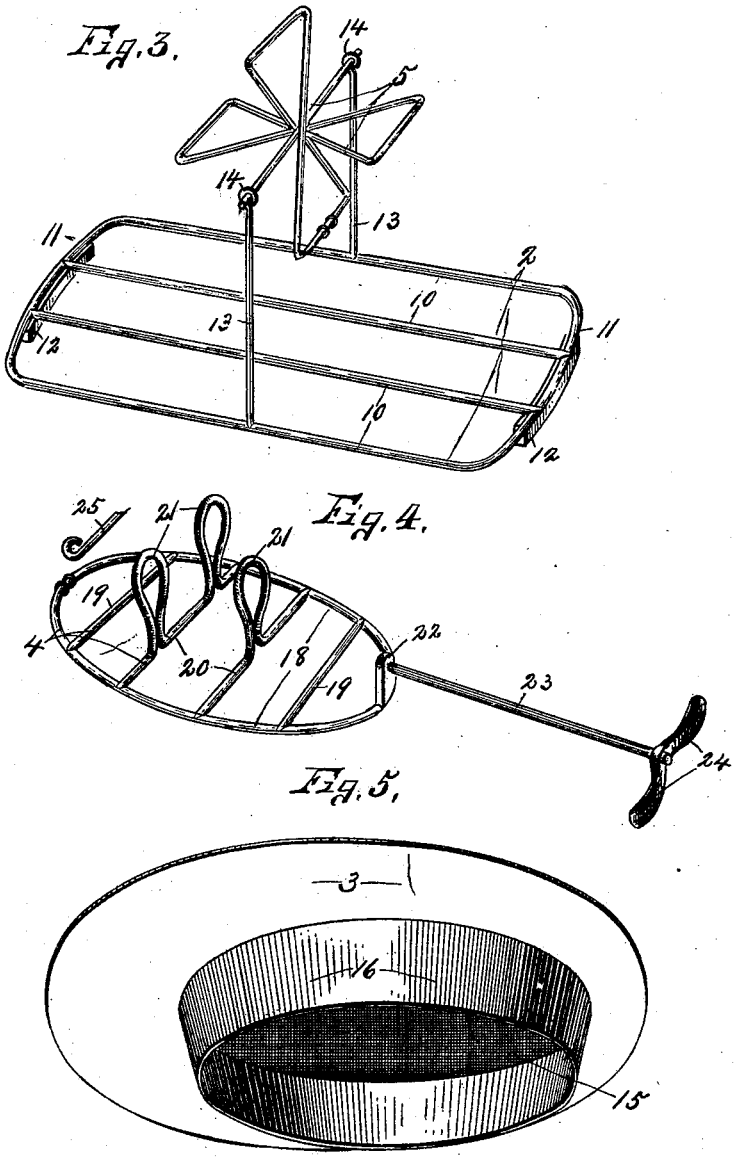

UNITED STATES PATENT OFFICE.

MORRIS LARY, OF NEW YORK, N. Y.

FLOUR-SIFTER.

SPECIFICATION forming part of Letters Patent No. 689,593, dated December 24, 1901.

Application filed April 24, 1901. Serial No. 57,295. (No model.)

*To all whom it may concern:*

Be it known that I, MORRIS LARY, of New York, in the county of New York, in the State of New York, have invented new and useful Improvements in Flour-Sifters, of which the following, taken in connection with the accompanying drawings, is a full, clear, and exact description.

My invention relates to improvements in flour-sifters.

The object of this invention is to provide a receptacle with a suitable screen, in proximity to which is movable an open-frame agitator operating in conjunction with a second agitator, which not only serves to feed the flour from the receptacle onto the former agitator and screen, but also acts as a check for preventing superfluous flow or packing of the flour upon the screen or upon said former agitator; and a further object is to connect the reciprocating and rocking agitators in such manner that the movement of one agitator simultaneously operates the other.

Figure 1:
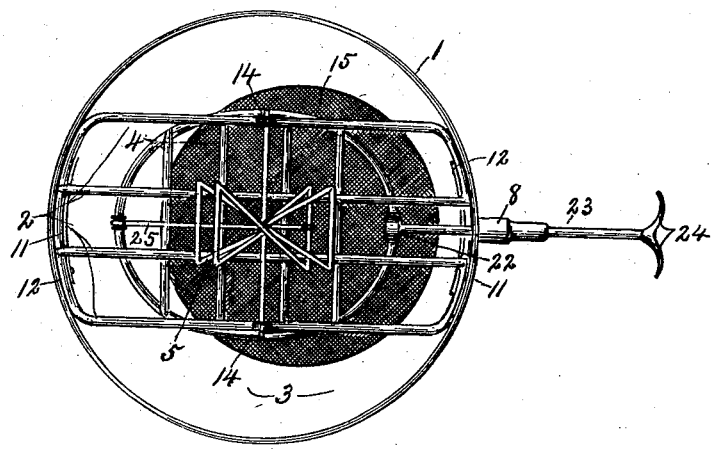
Figure 2:
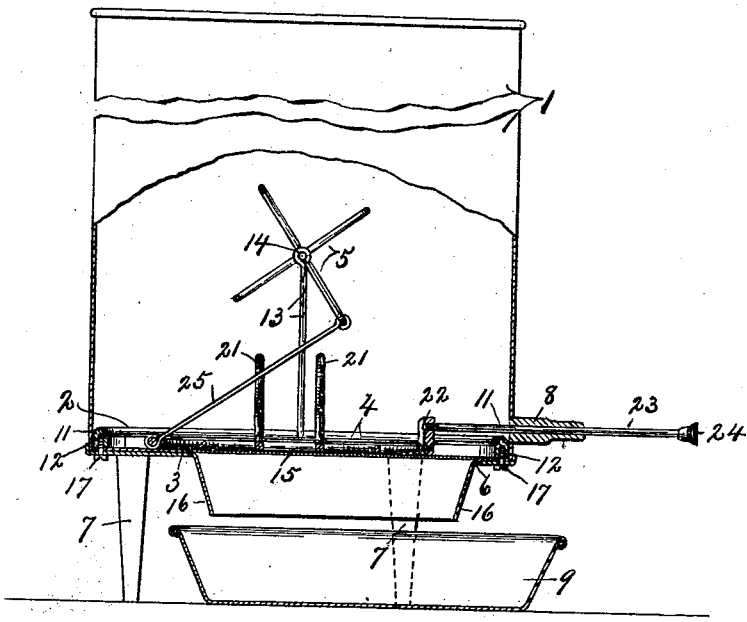

Referring to the drawings, Figure 1 is a top plan view of my invention. Fig. 2 is a longitudinal vertical section, partly in elevation, of the parts seen in Fig. 1, the receiving pan or tray being shown beneath the main flour-receptacle in alinement with the screen. Fig. 3 is an isometric view of the detached inner supporting-frame and the rotary agitator mounted thereon. Fig. 4 is an isometric view of the reciprocatingly-movable agitator and the handpiece connected thereto. Fig. 5 is an isometric view of the detached screen-supporting plate and collar surrounding the screen.

Similar reference characters indicate corresponding parts in all the views.

My invention consists, essentially, of a receptacle 1, an open supporting-frame 2 in the base of the receptacle, a screen-supporting plate 3, a reciprocatingly-movable agitator 4, and a rocking or partially rotatable agitator 5.

The receptacle 1 may be of any desired form, size, or material, and preferably consists of a cylindrical metal shell open at its upper end and having its bottom wall provided with an opening 6, which is preferably circular in form and is arranged eccentric or at one side of the bottom wall. This shell is provided with suitable supporting-legs 7 and a laterally-extending hollow boss or guide 8, the legs 7 being of such length as to support the bottom wall of the receptacle a sufficient distance above the table or other support upon which the receptacle is mounted to receive a suitable tray or pan 9, which is movable into and out of operative position for receiving the screened flour.

The frame 2 preferably consists of a series of separated substantially parallel bars formed of substantially the same length as the interior diameter of the shell of the receptacle, said parallel bars 10 being united at their opposite ends by transverse bars 11, which are provided with depending supports 12, which are adapted to rest upon the upper face of the screen-plate presently described for holding the intermediate portion of the frame 2 in separated relation to said screen or bottom wall, the purpose of thus supporting the bars 10 above the screen-plate being to form a chamber in which the reciprocatingly movable agitator is mounted and guided, the screen-plate and lengthwise bars 10 serving to hold the agitator 4 from vertical displacement and at the same time permit its reciprocal movement lengthwise of the bars 10. The outer bars 10 are provided with upright arms 13, having suitable eyes or bearings 14, in which is journaled the rocking agitator 5, said arms 13 being of such length as to support the agitator 5 a sufficient distance above the frame 2 to permit a free action of the agitator 5 without contact or friction with the frame 2.

The screen-supporting plate is preferably interposed between the bottom wall of the receptacle 1 and the open frame 2, being provided with a substantially circular screen 15, alined with the opening 6 in the bottom wall of the receptacle, and is also formed with a depending collar or annular flange 16, surrounding the peripheral edges of the screen and depending therefrom, this collar being preferably tapering downwardly and serving to guide the screened flour into the pan or tray 9, and thereby preventing the splashing of the flour or escape of the dust incidental to the sifting or screening of the flour. The peripheral edges of the screen-plate 3 are preferably impinged between the depending flanges 12 and the bottom wall of the receptacle 1, the frame 2 and screen-plate 3 being held in suitable position by suitable fastening means, as screws 17, passed through apertures in the bottom wall and screen-plate and engaged with threaded apertures in the flanges 12 of the frame 2. It is therefore evident that by removing said screws the several parts of the device may be readily disassembled.

The agitator 4, which is preferably interposed between the lengthwise bars 10 and the screen-plate 3, or rather screen 15, is reciprocally movable lengthwise of said bars across the upper face of the screen and usually consists of an elliptical-shaped open frame composed of an elliptical ring 18 and a series of substantially parallel transverse bars 19 and 20, the bars 19 and 20 being arranged at substantially right angles to the bars 10 of the frame 2 and being united at their opposite ends to the elliptical ring 18, the intermediate bars 20 being formed with upwardly-extending open loops 21, arranged in staggered relation to each other, which, together with the bars 19, serve to feed the flour to the screen and to force the same therethrough, the open loops 21 serving to prevent the packing of the flour and facilitate the agitation of the feed of the flour to the screen, it being understood that by forming the loops open little resistance is offered to the free reciprocating movement of the agitator 4 and that by forming the bars 19 and 20 and the loops 21 of the rounding cross-section the resistance to the movement of the agitator through the flour is reduced to a minimum and at the same time greatly facilitates the feed of the flour to the screen in small quantities. This agitator 4 is provided at its front end with an upwardly-projecting ear or lug 22, having a threaded aperture in which is secured a push-rod 23, guided in the boss or guide 8 and having its outer end provided with a suitable handpiece 24, whereby the agitator may be readily reciprocated back and forth over the surface of the screen.

The loops 21 extend above the frame 2 between the bars 10, and it is evident that said loops may be so arranged as to engage the side walls of said bars for the purpose of guiding the agitator 4 and holding the same from lateral displacement. It is also evident that this agitator 4 is further guided or held from lateral movement or displacement by the guide 8, being of sufficient length to prevent the cramping or binding of said push-rod during its reciprocating movement.

The rocking agitator 5, as previously stated, is journaled upon the upper ends of the standards 13 in the bearings 14 and usually consists of a series of substantially radial loops formed of wire or equivalent material, said loops being each arranged in the form of a triangle, the apexes of said loops being suitably joined or soldered to each other at the axis of rotation, and these triangular loops are arranged in planes substantially parallel with said axis. If desired, these several loops may be formed of a single piece of wire, as shown in the drawings, the opposite ends of the wire forming the trunnions or bearings upon which the several loops are rotated; but it is evident that these loops may be formed separately and secured in any other desired manner to a suitable shaft or spindle journaled in the bearings 14.

By forming the agitator 5 with a series of open loops, as just described, it is evident that the resistance to the rotation of the agitator is reduced to a minimum and that said agitator acts as a check to prevent the packing of the flour above the agitator 4 and at the same time serves as an efficient means for feeding the flour to the lower agitator 4 and to the screen in small quantities. This agitator 5 is connected to the rear end of the agitator 4 by a suitable link 25, having one end connected to the rear end of the ring 18 of the agitator 4 and its other end connected to one of the cross-bars of one of the loops of the agitator 5, so that when the agitator 4 is reciprocated across the screen 15 the agitator 5 is simultaneously rotated or rocked upon its axis in reverse directions. The axis of the agitator 5 is arranged at substantially right angles to the bars 10, and it is therefore evident that as the frame 4 is reciprocated back and forth across the screen the agitator 5 is rotated in substantially the same direction.

The operation of my invention will now be readily understood upon reference to the foregoing description and the accompanying drawings, and it will be noted that some change may be made in the detail construction and arrangement of the component parts of my improved flour-sifter without departing from the spirit of my invention.

Having thus described my invention, what I claim as new, and desire to secure by Letters Patent, is—

1. A flour-sifter comprising a receptacle having an opening in its bottom wall, a screen across the opening, a sliding member above the screen, and a rocking agitator connected to the sliding member and actuated thereby, said rocking agitator being provided with a series of open loops for the purpose set forth.

2. The combination with a receptacle having an opening in its bottom wall, a screen across the opening, a fixed open frame above the screen, an open-frame agitator movable between the screen and the fixed frame and provided with upwardly-projecting open loops and a rocking agitator connected to the reciprocating frame and actuated thereby.

3. In a flour-sifter the combination with a receptacle having an opening in its bottom wall, a screen across said opening, an open frame above the bottom wall and secured to the receptacle and provided with a series of separated substantially parallel lengthwise bars, an agitator interposed between the frame and screen and having a series of transverse bars provided with upwardly-extending open loops, a handpiece connected to the agitator for reciprocating the same across the screen, a rocking agitator mounted on the fixed frame and provided with a series of open loops, and means connected to the reciprocating agitator for operating the rocking agitator.

In witness whereof I have hereunto set my hand this 29th day of March, 1901.

MORRIS LARY.

Witnesses:
M. M. NOTT,
H. E. CHASE.